US012622839B1

(12) United States Patent
Tian et al.

(10) Patent No.: US 12,622,839 B1
(45) Date of Patent: May 12, 2026

(54) MALE SEX TOY WITH AN ADJUSTABLE ELASTIC STRUCTURE

(71) Applicant: Shuming Tian, Dongguan City (CN)

(72) Inventors: Shuming Tian, Dongguan City (CN); Nan Xiang, Dongguan City (CN)

( * ) Notice: Subject to any disclaimer, the term of this patent is extended or adjusted under 35 U.S.C. 154(b) by 0 days.

(21) Appl. No.: 18/986,638

(22) Filed: Dec. 18, 2024

(51) Int. Cl.
*A61H 19/00* (2006.01)

(52) U.S. Cl.
CPC ..... *A61H 19/32* (2013.01); *A61H 2201/1647* (2013.01)

(58) Field of Classification Search
CPC ...................................................... A61H 19/32
See application file for complete search history.

(56) References Cited

U.S. PATENT DOCUMENTS 8,308,631 B2 11/2012 Kobashikawa et al.
2010/0041944 A1* 2/2010 Levy ...................... A61H 19/32 600/38
2017/0231801 A1* 8/2017 Matsuura ............... A61H 19/00 600/38
2023/0046726 A1* 2/2023 Liu ........................ A61H 19/32
2023/0346632 A1* 11/2023 Tindal .................... A61H 19/32

* cited by examiner

*Primary Examiner* — Thaddeus B Cox
(74) *Attorney, Agent, or Firm* — Che-Yang Chen; Law Office of Michael Chen

(57) ABSTRACT

A male sex toy with an adjustable elastic structure includes a bracket sleeve assembly, the elastic abutting piece, the massage sleeve assembly and the elastic brake, wherein the elastic abutting piece is movably connected to the bracket sleeve assembly, and the elastic abutting piece is movably arranged between the massage sleeve assembly and the bracket sleeve assembly; the elastic brake is sleeved on the bracket sleeve assembly and rotatably provided, and the elastic brake rotates to push the elastic abutting piece to squeeze the massage sleeve assembly to reduce the sleeve size of the massage sleeve assembly, so that the sex toy can be adjusted according to different genital sizes, thereby solving the problem that the male sex toy cannot fit different male genital sizes at the same time.

8 Claims, 8 Drawing Sheets

MALE SEX TOY WITH AN ADJUSTABLE ELASTIC STRUCTURE

FIELD OF THE INVENTION

The invention relates to the technical field of male sex toys, in particular to a male sex toy with an adjustable elastic structure.

BACKGROUND OF THE INVENTION

With the accelerated pace of life and the increase of work pressure, men's health problems have gradually surfaced, especially problems such as decreased sexual function, genital erectile dysfunction and maldevelopment, which have a significant impact on the quality of life of men. In addition to taking medication, the existing treatment methods also include massage therapy through sex toys.

Specifically, male sex toys effectively massage the male genitals by simulating professional massage techniques, so as to achieve the purpose of treating genital disorders and improving sexual function. However, traditional male sex toys can usually only fit one size of male genitals, which leads to the size of sex toy massagers cannot be adjusted according to the genital size of different men. Due to individual differences in the size of male genitals, traditional male sex toy massagers are often difficult to provide perfect fit, and often appear to be too small, which may cause the genitals to be tightened and affect blood circulation, or too large in size may not achieve effective massage effects.

For this reason, it is necessary to propose a male sex toy with an adjustable elastic structure in view of the above-mentioned shortcomings.

SUMMARY OF THE DISCLOSURE

The present invention provides a male sex toy with an adjustable elastic structure to solve the above-mentioned technical problems.

A male sex toy with an adjustable elastic structure, comprising a bracket sleeve assembly, an elastic abutting piece, and a massage sleeve assembly arranged in the aforementioned bracket sleeve assembly, wherein the massage sleeve assembly is used to be sleeved on the male genitals, the elastic abutting piece is movably connected to the bracket sleeve assembly, and the elastic abutting piece is movably arranged between the massage sleeve assembly and the bracket sleeve assembly;

The elastic brake is sleeved on the aforementioned bracket sleeve assembly, the elastic brake is rotatably connected to the bracket sleeve assembly, and the elastic brake can rotate around the axis of the bracket sleeve assembly, and push the elastic abutting piece to squeeze the massage sleeve assembly to reduce the sleeve size of the massage sleeve assembly.

In an embodiment, the bracket sleeve assembly includes a first bracket column sleeve, and an opening at one end of the first bracket column sleeve is folded inwardly toward the axis direction to form a rotating circular bottom plate;

The elastic brake includes a brake column sleeve, the first bracket column sleeve is sleeved on the brake column sleeve, and one end of the brake column sleeve extends into the first bracket column sleeve, and is rotatably abutted against the rotating circular bottom plate.

In an embodiment, at least three rotating guide columns are provided on the side surface of one end of the brake column sleeve;

An arc-shaped limiting groove is provided on the inner side surface of the rotating circular bottom plate, the rotation of the brake column sleeve can drive the rotating guide column to slide along the arc-shaped limiting groove, and the arc-shaped limiting groove is used to limit the sliding path of the brake column sleeve.

In an embodiment, the side wall of the brake column sleeve includes at least three arc-shaped eccentric walls, and the arc-shaped eccentric walls are arranged in sequence at equal intervals around the axis of the first bracket column sleeve.

In an embodiment, an eccentric arc surface is provided on the inner side of the arc-shaped eccentric wall, one side of the eccentric arc surface is an initial end side, and the other side is a pushing end side;

When the initial end side abuts against the elastic abutting piece, the elastic abutting piece does not move toward the massage sleeve assembly;

When the pushing end side abuts against the elastic abutting piece, the elastic abutting piece moves toward the direction of the massage sleeve assembly with the maximum distance and the maximum extrusion force.

In an embodiment, the elastic abutting piece includes an arc-shaped vertical plate and a sliding block arranged on the outer side of the arc-shaped vertical plate, the inner side of the sliding block is integrally connected to the arc-shaped vertical plate, and the outer side of the sliding block is used to slide and abut against the brake column sleeve.

In an embodiment, the bracket sleeve assembly also includes a second bracket base, one end of the second bracket base is connected to the other end of the brake column sleeve, and the side surface of one end of the second bracket base extends toward the first bracket column sleeve to form at least three sliding guide plates. The sliding guide plates are used to limit the moving distance of the sliding block.

In an embodiment, the rotating circular bottom plate extends toward the direction of the second bracket base to form a sliding guide groove plate corresponding to the sliding guide plate, the sliding guide groove plate is provided with a sliding groove opening toward the second bracket base, and the end of the sliding guide plate is provided to seal the opening of the sliding groove;

The upper and lower sections of the sliding block are provided with a clamping groove opening upward and downward, the sliding guide groove plate and the end of the sliding guide plate are provided with sliding columns, the sliding column is provided in the sliding groove and the sliding column is provided in the clamping groove, and the sliding columns are used to limit the moving distance and moving direction of the sliding block pushed by the brake column sleeve.

In an embodiment, the elastic brake further comprises a rotating ball, the rotating ball is arranged between the rotating circular bottom plate and the brake column sleeve, and slides along the arc-shaped limiting groove. The rotating ball is used to reduce the rotational friction between the brake column sleeve and the rotating circular bottom plate;

A plurality of centripetal transition grooves are provided on the rotating circular bottom plate, and the centripetal transition grooves are arranged at an angle to the arc-shaped limiting grooves. The centripetal transition grooves are used to limit the rotating balls that stop sliding at positions other than the two ends of the arc-shaped limiting grooves.

In an embodiment, the brake column sleeve is provided with a fixing hole connecting the two ends, the bracket sleeve assembly further includes a third bracket base, and a spring fixing column installed in the fixing hole is provided on the side of one end of the third bracket base;

The elastic brake also includes a ball return spring, one end of which is arranged in the fixing hole and abuts against the spring fixing column, and the other end of the ball return spring abuts against the rotating ball. The ball return spring is used to push the rotating ball to abut against the arc-shaped limiting groove or the centripetal transition groove.

According to the above technical solutions, the beneficial effects of the present invention are: a male sex toy with an adjustable elastic structure, through the rotating connection between the elastic brake and the bracket sleeve assembly, thereby pushing the elastic abutting piece to squeeze the massage sleeve assembly, or the elastic abutting piece can be pushed to reset by withdrawing the squeezing force and combining the elasticity of the massage sleeve assembly, so that the size of the massage through hole in the massage sleeve assembly can be adjusted, and finally, the sex toy can be adjusted according to the size of different male genitals, so that the present invention can better fit the size of different male genitals.

BRIEF DESCRIPTION OF THE DRAWINGS

Figure 1:
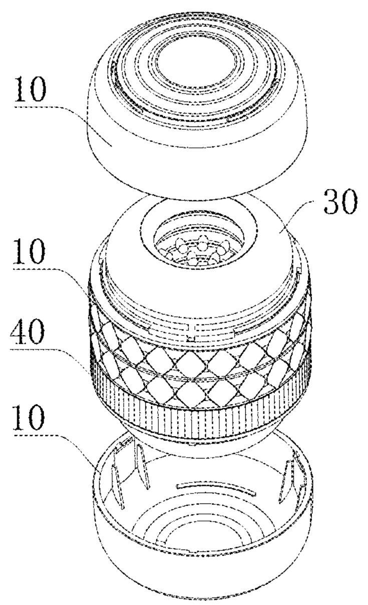
FIG. 1 is a schematic structural view of a male sex toy with an adjustable elastic structure according to the present invention.

Other features, objects and advantages of the present invention will be more clearly and completely by the detailed description of the non-limiting embodiments with reference to the attached drawings (FIG. 1 to FIG. 8). Obviously, the described embodiments are only part of the embodiments of the present invention, but not all of them. Based on the embodiments of the present invention, all other embodiments obtained by ordinary technicians in the field without creative labor are within the protection scope of the present invention.

Referring to FIGS. 1-8, the present invention provides a male sex toy with adjustable elastic structure, including a bracket sleeve assembly 10, three elastic abutting pieces 20, a massage sleeve assembly 30 and an elastic brake 40, wherein the massage sleeve assembly 30 includes a massage sleeve body 31 and an isolation sleeve 32 sleeved on the outside of the massage sleeve body 31. The massage sleeve body 31 is used to be sleeved on the male genitals under massage state, and the isolation sleeve 32 is used to isolate the massage sleeve body 31 from direct contact with other structures to protect the massage sleeve body 31. Specifically, the bracket sleeve assembly 10 is provided in as cylindrical, and a massage through hole 311 is opened in the middle to connect the two ends, the massage sleeve assembly 30 is arranged in the massage through hole 311, and the axes of the two are arranged to coincide with each other. The three elastic abutting pieces 20 are movably arranged between the massage sleeve assembly 30 and the bracket sleeve assembly 10. Further, the three elastic abutting pieces 20 are arranged at equal intervals in the horizontal direction around the axis of the bracket sleeve assembly 10, and the elastic abutting pieces 20 are located between the isolation sleeve 32 and the inside of the massage through hole 311. At the same time, the elastic abutting pieces 20 are movably connected to the bracket sleeve assembly 10. In addition, the elastic brake 40 is sleeved on the outside of the bracket sleeve assembly 10, the elastic brake 40 is rotatably connected to the bracket sleeve assembly 10, and the elastic brake 40 can rotate around the axis of the bracket sleeve assembly 10 and push the elastic abutting pieces 20 to move toward the axis direction of the bracket sleeve assembly 10. It needs to be explained that by rotating the elastic brake 40 in the first direction, with the structure of elastic abutting pieces 20 being movably arranged between the massage sleeve assembly 30 and the bracket sleeve assembly 10, the elastic brake 40 can simultaneously push the three elastic abutting pieces 20 to squeeze the isolation sleeve 32 of the massage sleeve assembly 30, so that the massage sleeve body 31 shrinks toward the axis direction of the bracket sleeve assembly 10, thereby reducing the transverse aperture size of the massage through hole 311. In addition, by rotating the elastic brake 40 in the direction opposite to the first direction, the pressing force on the elastic abutting pieces 20 can be removed. At this time, with the structure of massage sleeve body 31 and the isolation sleeve 32, which are both made of elastic material such as rubber material, the massage sleeve assembly 30 can use the elastic force generated when it is compressed to push the elastic abutting pieces 20 to reset, thereby expanding the transverse aperture size of the massage through hole 311. Therefore, through the structures of the elastic brake 40, the bracket sleeve assembly 10, and the elastic abutting pieces 20, the present invention can adjust the size of the massage through hole 311, so that the sex toy can be adjusted according to the genital sizes of different men, and finally the present invention can better fit the sizes of different male genitals.

Figure 7:
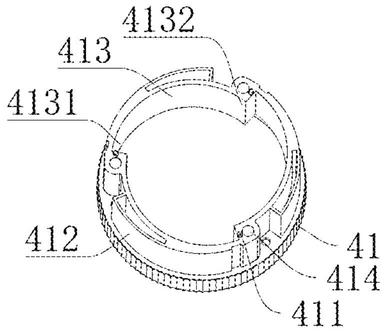
FIG. 7 is a schematic structural view of the brake column sleeve of a male sex toy with an adjustable elastic structure according to the present invention.
Figure 8:
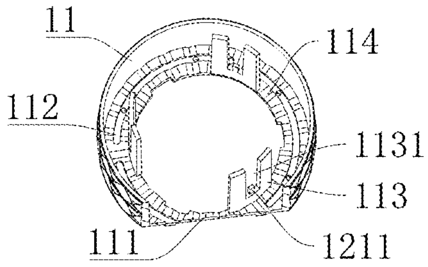
FIG. 8 is a schematic structural view of the first bracket column sleeve of a male sex toy with an adjustable elastic structure according to the present invention.

In some embodiments, referring to FIGS. 7-8, the bracket sleeve assembly 10 includes a first bracket column sleeve 11, and an opening at one end of the first bracket column sleeve 11 is folded inwardly toward the axial direction to form a rotating circular bottom plate 111. In addition, the elastic brake 40 includes a brake column sleeve 41; the first bracket column sleeve 11 is sleeved on the brake column sleeve 41, and one end of the brake column sleeve 41 is extended into the first bracket column sleeve 11, and the outer wall of the brake column sleeve 41 near one end section is rotatably abutted against the inner wall of the first bracket column sleeve 11; wherein one end of the brake column sleeve 41 is abutted against the inner plane of the rotating circular bottom plate 111, and the brake column sleeve 41 is rotatably connected to the rotating circular bottom plate 111. It should be supplemented that the inner side wall of the brake column sleeve 41 can be abutted against the elastic abutting pieces 20, so that when the brake column sleeve 41 is rotatably connected to the rotating circular bottom plate 111, the elastic abutting pieces 20 can be pushed to move toward the axial direction of the first bracket column sleeve 11.

In some embodiments, referring to FIGS. 2 and 5-8, at least three rotating guide columns 411 are provided on the side surface of one end of the brake column sleeve 41. At the same time, an arc-shaped limiting groove 112 is provided on the inner side surface of the rotating circular bottom plate 111, and the rotation of the brake column sleeve 41 can drive the rotating guide column 411 to slide along the arc-shaped limiting groove 112. The arc-shaped limiting groove 112 is used to limit the sliding path of the brake column sleeve 41.

Further, referring to FIGS. 7-8, the side wall of the brake column sleeve 41 includes at least three arc-shaped eccentric walls 412, and the arc-shaped eccentric walls 412 are arranged in sequence at equal intervals around the axis of the first bracket column sleeve 11.

Specifically, referring to FIGS. 7-8, three independently arranged arc-shaped limiting grooves 112 are opened on the rotating circular bottom plate 111 at equal intervals around the axis of the first bracket column sleeve 11, and the three arc-shaped eccentric walls 412 correspond to the three arc-shaped limiting grooves 112. Further, the three rotating guide columns 411 are respectively located on the side surfaces of the three arc-shaped eccentric walls 412 close to one end of the rotating circular bottom plate 111, so that when the brake column sleeve 41 rotates, the arc-shaped eccentric walls 412 drives the rotating guide columns 411 to slide along the arc-shaped limiting groove 112, wherein part of the outer side of the arc-shaped eccentric walls 412 is rotationally abutted against the inner wall of the first bracket column sleeve 11, the inner side of the arc-shaped eccentric walls 412 combined with its own eccentric structural setting relative to the first bracket column sleeve 11, the elastic abutting pieces 20 can be squeezed and pushed, therefore the elastic abutting pieces 20 can adjust the aperture size of the massage sleeve assembly 30.

Further, referring to FIG. 7, an eccentric arc surface 413 is provided on the inner side of the arc-shaped eccentric wall 412, wherein one side of the eccentric arc surface 413 is an initial end side 4131, and the other side is a pushing end side 4132. In addition, when the initial end side 4131 abuts against the elastic abutting piece 20, the elastic abutting piece 20 does not move toward the direction of the massage sleeve assembly 30. When the pushing end side 4132 abuts against the elastic abutting piece 20, the elastic abutting piece 20 moves toward the direction of the massage sleeve assembly 30 with the maximum distance and the maximum extrusion force. Specifically, the distance between the inner side of the pushing end side 4132 and the axis of the first bracket column sleeve 11 is L1, the distance between the inner side surface of the initial end side 4131 and the axis of the first bracket column sleeve 11 is L2, and $L1<L2$; the distance between the transition area from the initial end side 4131 to the pushing end side 4132 and the axis of the first bracket column sleeve 11 gradually decreases, so that when the rotated brake column sleeve 41 drives the arc-shaped eccentric wall 412 to slide along the arc-shaped limiting groove 112, the arc-shaped eccentric wall 412 can push the elastic abutting piece 20 to move toward the axis of the first bracket column sleeve 11, shortening the distance between the elastic abutting piece 20 and the first bracket column sleeve 11, thereby achieving the squeezing of the massage sleeve assembly 30 and adjusting the aperture size of the massage through hole 311.

In some embodiments, referring to FIGS. 2 and 4-6, the elastic abutting piece 20 includes an arc-shaped vertical plate 21 and a sliding block 22 arranged on the outside of the arc-shaped vertical plate 21. The inner side of the sliding block 22 is integrally connected to the arc-shaped vertical plate 21, and the outer side of the sliding block 22 is used to slide and abut against the brake column sleeve 41. Specifically, the arc-shaped vertical plate 21 is arranged between the massage sleeve body 31 and the isolation sleeve 32, and the sliding block 22 is movably arranged through the isolation sleeve 32; wherein the inner end of the sliding block 22 is integrally connected to the outer side surface of the arc-shaped vertical plate 21, so that the arc-shaped eccentric wall 412 of the brake column sleeve 41 abuts against the outside vertical surface of the sliding block 22, and pushes the sliding block 22 to pass through the isolation sleeve 32 and move toward the massage sleeve body 31, thereby driving the arc-shaped vertical plate 21 to squeeze the massage sleeve body 31, reducing the aperture size of the massage through hole 311, and achieving the purpose that the male sex toy of the present invention can fit the different sizes of male genitals. When the arc-shaped eccentric wall 412 of the brake column sleeve 41 does not apply a driving force to the sliding block 22, the massage sleeve body 31 pushes the arc-shaped vertical plate 21 and the sliding block 22 to move outward and reset according to the elastic force generated when it is squeezed, so that the aperture size of the massage through hole 311 can be expanded and reset. It needs to be explained that when the brake column sleeve 41 rotates in the first direction, the initial end side 4131 is in front of the pushing end side 4132 from the rotation path, combined with the structural setting of the eccentric arc surface 413 and the parameter setting described in the previous paragraph of $L1<L2$, it can be concluded that the brake column sleeve 41 can push the arc-shaped vertical plate 21 to move in the axial direction of the first bracket column sleeve 11, further squeeze the massage sleeve body 31 and reduce the aperture size of the massage through hole 311. Conversely, the brake column sleeve 41 rotates in the opposite direction of the first direction, and the aperture size of the massage through hole 311 can be reset.

Figure 3:
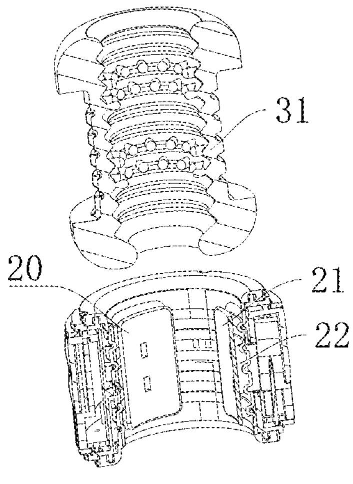
FIG. 3 is a schematic structural view of the massage sleeve assembly and the bracket sleeve assembly of a male sex toy with an adjustable elastic structure according to the present invention.
Figure 4:
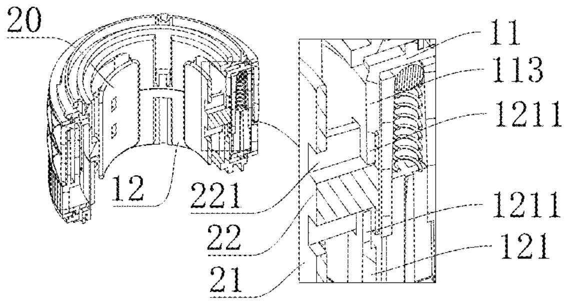
FIG. 4 is a cross-sectional view of the bracket sleeve assembly and the elastic brake of a male sex toy with an adjustable elastic structure according to the present invention.
Figure 6:
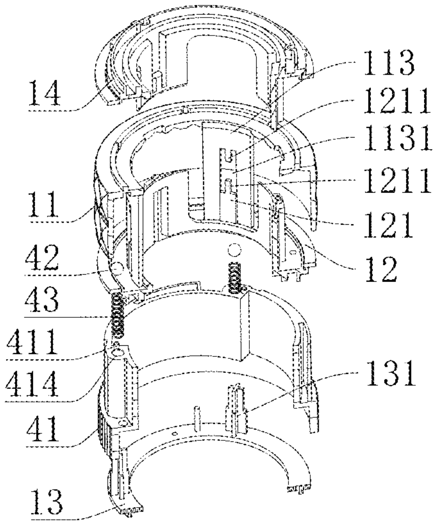
FIG. 6 is an exploded cross-sectional view of the bracket sleeve assembly and the elastic brake of a male sex toy with an adjustable elastic structure according to the present invention.

In some embodiments, referring to FIGS. 3-4 and 6, the bracket sleeve assembly 10 also includes a second bracket base 12, one end of the second bracket base 12 is connected to the other end of the brake column sleeve 41, and the side surface of one end of the second bracket base 12 extends toward the first bracket column sleeve 11 to form at least three sliding guide plates 121. The sliding guide plates 121 are used to limit the moving distance of the sliding block 22.

Further, referring to FIG. 6, the rotating circular bottom plate 111 extends toward the direction of the second bracket base 12 to form a sliding guide groove plate 113 corresponding to the sliding guide plate 121. The sliding guide groove plate 113 is provided with a sliding groove 1131 opening toward the second bracket base 12, and the end of the sliding guide plate 121 is provided to seal the opening of the sliding groove 1131. In addition, the upper and lower sections of the sliding block 22 are provided with a clamping groove 221 opening upward and downward, the sliding guide groove plate 113 and the end of the sliding guide plate 121 are provided with sliding columns 1211, the sliding column 1211 is provided in the sliding groove 1131 and the sliding column 1211 is provided in the clamping groove 221, and the sliding columns 1211 are used to limit the moving distance and moving direction of the sliding block 22 pushed by the brake column sleeve 41.

Specifically, referring to FIGS. 2-4 and 6, the three sliding guide groove plates 113 and the three sliding guide plates 121 are all located outside the isolation sleeve 32, one sliding guide groove plate 113 and one sliding guide plate 121 are arranged in a group, the sliding guide plates 121 and the sliding guide groove plates 113 form three groups of guide auxiliary structures, the guide auxiliary structures are arranged at equal intervals on the same plane with the axis of the first bracket column sleeve 11 as the center of the circle; wherein the sliding block 22 passes through the isolation sleeve 32 and the sliding groove 1131 at the same time, combined with the structural setting that the sliding column 1211 is provided on the upper and lower parts of the sliding groove 1131, and a clamping groove 221 is provided on the upper and lower end surfaces of the sliding block 22 and is movably connected with the sliding columns 1211, the sliding block 22 can be movably arranged through the sliding groove 1131. At the same time, the sliding column 1211 is installed in the clamping groove 221, thereby limiting the sliding block 22 from being separated from the sliding groove 1131, and further limiting the moving distance and moving direction of the sliding block 22.

In some embodiments, referring to FIGS. 2, 4-6, and 7, the elastic brake 40 also includes a rotating ball 42, which is arranged between the rotating circular bottom plate 111 and the brake column sleeve 41, and slides along the arc-shaped limiting groove 112. The rotating ball 42 is used to reduce the rotational friction between the brake column sleeve 41 and the rotating circular bottom plate 111. Specifically, the rotating ball 42 abuts against the inner side surface of the rotating circular bottom plate 111, the rotating ball 42 slides within the arc-shaped limiting groove 112, and abuts against one end side of the brake column sleeve 41. With the structure of the rotating guide column 411 arranged in the arc-shaped limiting groove 112 and the structure of the rotating ball 42, it can prevent the rotating circular bottom plate 111 and the brake column sleeve 41 from directly sliding and abutting against each other when the rotating guide column 411 slides along the arc-shaped limiting groove 112, therefore, the rotational wear and the friction between them can be reduced. In addition, a plurality of centripetal transition grooves 114 are provided on the rotating circular bottom plate 111, the centripetal transition grooves 114 are arranged at an angle to the arc-shaped limiting grooves, and the centripetal transition grooves 114 are used to limit the rotating balls 42 that stop sliding at positions other than the two ends of the arc-shaped limiting grooves 112. Specifically, the plurality of centripetal transition grooves 114 are arranged in the axial direction of the first bracket column sleeve 11, and the centripetal transition grooves 114 are arranged at an acute angle to the arc-shaped limiting grooves 112, so that when the rotating balls 42 slide along the sliding limit grooves and pause halfway, the centripetal transition grooves 114 can hinder and offset the inertia of the rotating balls 42 that continue to slide forward, thereby limiting the rotating balls 42 and improving the emergency stop stability of the brake column sleeve 41 when it rotates.

Further, referring to FIGS. 2 and 4-7, the brake column sleeve 41 is provided with a fixing hole 414 communicating with both ends, the bracket sleeve assembly 10 further includes a third bracket base 13, and a spring fixing column 131 installed in the fixing hole 414 is provided on the side of one end of the third bracket base 13. In addition, the elastic brake 40 also includes a ball return spring 43, one end of the ball return spring 43 is arranged in the fixing hole 414 and abuts against the spring fixing column 131, and the other end of the ball return spring 43 abuts against the rotating ball 42. The ball return spring 43 is used to push the rotating ball 42 to abut against the arc-shaped limiting groove 112 or the centripetal transition groove 114. Specifically, the spring fixing column 131 of the third bracket base 13 passes through the fixing hole 414, so that the third bracket base 13 is fixedly abutted against the other end of the brake column sleeve 41. At the same time, one end of the ball return spring 43 passes through the fixing hole 414 from one end of the brake column sleeve 41 and is abutted against the spring fixing column 131, and the other end is abutted against the rotating ball 42, thereby generating a thrust toward the rotating circular bottom plate 111 for the rotating ball 42, so that the rotating ball 42 is always fitted with the rotating circular bottom plate 111, that is, the rotating ball 42 can abut against the arc-shaped limiting groove 112 or the centripetal transition groove 114, thereby better improving the emergency stop stability of the brake column sleeve 41 during rotation.

Figure 2:
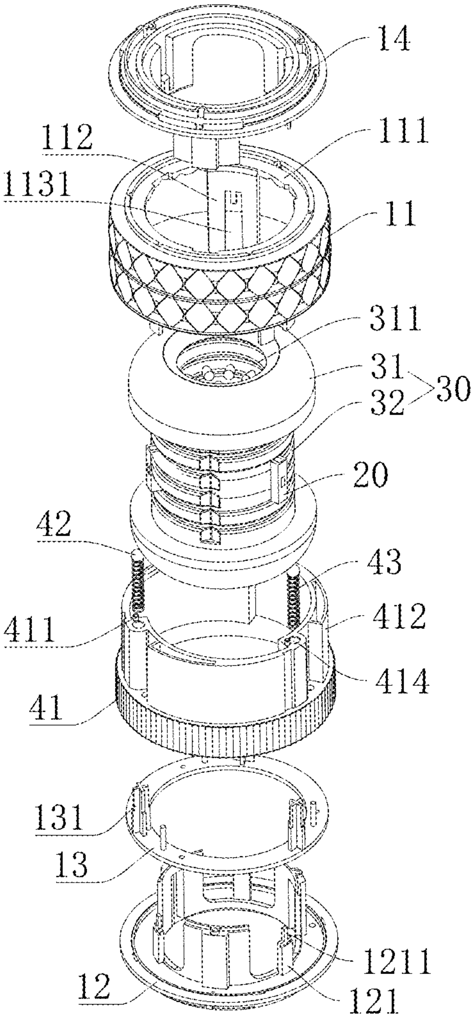
FIG. 2 is an exploded view of a male sex toy with an adjustable elastic structure according to the present invention.
Figure 5:
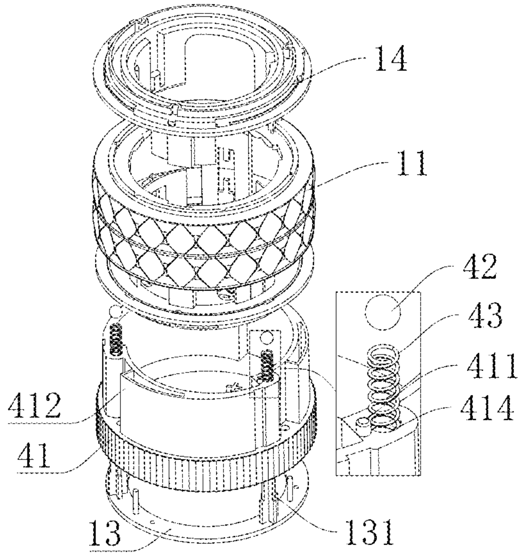
FIG. 5 is an exploded view of the bracket sleeve assembly and the elastic brake of a male sex toy with an adjustable elastic structure according to the present invention.

In some embodiments, referring to FIGS. 2 and 5-6, the bracket sleeve assembly 10 also includes a fourth bracket base 14, which is located at one end of the first bracket column sleeve 11, and the fourth bracket base 14 is fixedly abutted against the first bracket column sleeve 11, wherein the lower end of the fourth bracket base 14 extends into the first bracket column sleeve 11 and is fixedly abutted against the third bracket base 13, thereby forming a bracket with a relatively stable structural connection relationship through the first bracket column sleeve 11, the second bracket base 12, and the fourth bracket base 14.

Hereinafter, embodiments of the present invention have been described in detail with reference to the accompanying drawings. While the description above refers to the particular embodiments of the present invention, it will be understood that many modifications may be made without departing from the spirit thereof. Any equivalent replacement or modification would fall within the protection scope of the present invention.

What is claimed is:

1. A male sex toy with adjustable tightness structure, comprising a bracket sleeve assembly, an elastic abutting piece, and a massage sleeve assembly arranged in the bracket sleeve assembly, wherein the massage sleeve assembly is used to be sleeved on male genitals, the elastic abutting piece is movably connected to the bracket sleeve assembly, and the elastic abutting piece is movably arranged between the massage sleeve assembly and the bracket sleeve assembly;

wherein an elastic driving unit is sleeved on the bracket sleeve assembly, the elastic driving unit is rotatably connected to the bracket sleeve assembly, and the elastic driving unit can rotate around an axis of the bracket sleeve assembly, and push the elastic abutting piece to squeeze the massage sleeve assembly to reduce a sleeve size of the massage sleeve assembly, wherein the bracket sleeve assembly includes a first bracket column sleeve, and an opening at one end of the first bracket column sleeve is folded inwardly toward an axis direction to form a rotating circular bottom plate; said elastic driving unit includes a brake column sleeve, the first bracket column sleeve is sleeved on the brake column sleeve, and one end of the brake column sleeve extends into the first bracket column sleeve, and is rotatably abutted against the rotating circular bottom plate.

2. The male sex toy with adjustable tightness structure according to claim 1, wherein at least three rotating guide columns are provided on a side surface of one end of the brake column sleeve; and an arc-shaped limiting groove is provided on an inner side surface of the rotating circular bottom plate, a rotation of the brake column sleeve can drive each rotating guide column to slide along the arc-shaped limiting groove, and the arc-shaped limiting groove is used to limit a sliding path of the brake column sleeve.

3. The male sex toy with adjustable tightness structure according to claim 2, wherein the elastic driving unit further comprises a rotating ball, the rotating ball is arranged between the rotating circular bottom plate and the brake column sleeve, and slides along the arc-shaped limiting groove; the rotating ball is used to reduce rotational friction between the brake column sleeve and the rotating circular bottom plate; and a plurality of centripetal transition grooves are provided on the rotating circular bottom plate, and the plurality of centripetal transition grooves are arranged at an angle to the arc-shaped limiting groove, and the plurality of centripetal transition grooves are used to secure the rotating ball.

4. The male sex toy with adjustable tightness structure according to claim 3, wherein the brake column sleeve is provided with a fixing hole, the bracket sleeve assembly further includes a third bracket base, and a spring fixing column installed in the fixing hole is provided on a side of one end of the third bracket base; said elastic driving unit also includes a ball return spring, one end of which is arranged in the fixing hole and abuts against the spring fixing column, and another end of the ball return spring abuts against the rotating ball, and the ball return spring is used to push the rotating ball to abut against the arc-shaped limiting groove or one of the centripetal transition grooves.

5. The male sex toy with adjustable tightness structure according to claim 1, wherein a side wall of the brake column sleeve includes at least three arc-shaped eccentric walls, and each arc-shaped eccentric wall is arranged in sequence at equal intervals around an axis of the first bracket column sleeve.

6. The male sex toy with adjustable tightness structure according to claim 5, wherein an eccentric arc surface is provided on an inner side of each arc-shaped eccentric wall, one side of the eccentric arc surface is an initial end side, and another side is a pushing end side; when the initial end side abuts against the elastic abutting piece, the elastic abutting piece does not move toward the massage sleeve assembly; and when the pushing end side abuts against the elastic abutting piece, the elastic abutting piece moves toward a direction of the massage sleeve assembly with a maximum distance and a maximum extrusion force.

7. The male sex toy with adjustable tightness structure according to claim 1, wherein the elastic abutting piece includes an arc-shaped vertical plate and a sliding block arranged on an outer side of the arc-shaped vertical plate, an inner side of the sliding block is integrally connected to the arc-shaped vertical plate, and an outer side of the sliding block is used to slide and abut against the brake column sleeve.

8. The male sex toy with adjustable tightness structure according to claim 7, wherein the bracket sleeve assembly also includes a second bracket base, one end of the second bracket base is connected to an end of the brake column sleeve, and a side surface of one end of the second bracket base extends toward the first bracket column sleeve to form at least three sliding guide plates, each of which is used to limit a moving distance of the sliding block.

* * * * *